US009045313B2

(12) United States Patent
Benosman et al.

(10) Patent No.: US 9,045,313 B2
(45) Date of Patent: Jun. 2, 2015

(54) ELEVATOR ROPE SWAY ESTIMATION

(75) Inventors: Mouhacine Benosman, Boston, MA (US); Scott A. Bortoff, Brookline, MA (US)

(73) Assignee: Mitsubishi Electric Research Laboratories, Inc., Cambridge, MA (US)

(*) Notice: Subject to any disclaimer, the term of this patent is extended or adjusted under 35 U.S.C. 154(b) by 513 days.

(21) Appl. No.: 13/446,658

(22) Filed: Apr. 13, 2012

(65) Prior Publication Data

US 2013/0275081 A1 Oct. 17, 2013

(51) Int. Cl.

| | |
|---|---|
| ***G01C 9/00*** | (2006.01) |
| ***G01C 17/00*** | (2006.01) |
| ***G01C 19/00*** | (2013.01) |
| ***B66B 7/06*** | (2006.01) |

(52) U.S. Cl.

CPC ........................................ *B66B 7/06* (2013.01)

(58) Field of Classification Search

USPC .......................................................... 702/150

See application file for complete search history.

(56) References Cited

U.S. PATENT DOCUMENTS

| | | | | |
|---|---|---|---|---|
| 5,345,042 | A * | 9/1994 | Jamieson | 177/165 |
| 5,641,041 | A * | 6/1997 | Masuda et al. | 187/347 |
| 5,731,528 | A * | 3/1998 | Yamazaki et al. | 73/862.41 |
| 5,862,888 | A * | 1/1999 | Iwakiri et al. | 187/345 |
| 5,959,266 | A * | 9/1999 | Uchiumi | 187/292 |
| 6,123,176 | A * | 9/2000 | O'Donnell et al. | 187/393 |
| 6,325,179 | B1 * | 12/2001 | Barreiro et al. | 187/393 |
| 6,450,299 | B1 * | 9/2002 | Lysaght | 187/393 |
| 6,854,330 | B2 * | 2/2005 | Potter | 73/514.25 |
| 7,503,606 | B2 * | 3/2009 | Hall et al. | 294/81.52 |
| 7,578,373 | B2 * | 8/2009 | Shiratsuki et al. | 187/391 |
| 7,614,482 | B2 * | 11/2009 | Shikai et al. | 187/391 |
| 7,617,911 | B2 * | 11/2009 | Mattila et al. | 187/391 |
| 7,992,689 | B2 * | 8/2011 | Stolt et al. | 187/393 |
| 8,077,208 | B2 * | 12/2011 | Ahonen | 348/207.99 |
| 8,162,110 | B2 * | 4/2012 | Smith et al. | 187/393 |
| 8,463,519 | B2 * | 6/2013 | McCann | 701/70 |
| 8,488,847 | B2 * | 7/2013 | Nozaki et al. | 382/118 |

FOREIGN PATENT DOCUMENTS

| | | | |
|---|---|---|---|
| JP | 20040250217 | A | 9/2004 |
| JP | WO2010013597 | * | 2/2010 |
| WO | 2010013597 | A1 | 2/2010 |

OTHER PUBLICATIONS

Masatsugu Otsuki, KaruoYoshida, Kosoku Nagata, Shlgeru Fujimoto,Toshlakl Nakagawa (Experimental Study on Vibration Control), May 8-10, 2002.*

* cited by examiner

*Primary Examiner* — Sujoy Kundu
*Assistant Examiner* — Alvaro Fortich
(74) *Attorney, Agent, or Firm* — Dirk Brinkman; Gene Vinokur

(57) ABSTRACT

A method and a system determine a position of at least one sway sensor in an elevator system for sensing a lateral motion of an elevator rope between a first boundary location and a second boundary location. An operation of the elevator system is simulated with a model of the elevator system to produce an actual shape of the elevator rope caused by the operation. At least one sway location is determined, such that an error between the actual shape of the elevator rope and an estimated shape of the elevator rope is minimized. The estimated shape of the elevator rope is determined by interpolation of the first boundary location, the second boundary location, and the sway location. The position of the sway sensor is determined, such that the sway sensor senses the lateral motion of the elevator rope at the sway location.

16 Claims, 18 Drawing Sheets

100

200

300

400

499

500

600

700

800

900

1000

1100

ELEVATOR ROPE SWAY ESTIMATION

FIELD OF THE INVENTION

This invention relates generally to elevator systems, and more particularly to measuring a sway of an elevator rope of an elevator system.

BACKGROUND OF THE INVENTION

Typical elevator systems include a car and a counterweight confined to travel along guiderails in a vertically extending elevator shaft. The car and the counterweight are connected to each other by hoist ropes. The hoist ropes are wrapped around a sheave located in a machine room at the top (or bottom) of the elevator shaft. In conventional elevator systems, the sheave is powered by an electrical motor. In other elevator systems, the sheave is unpowered, and the drive means is a linear motor mounted on the counterweight.

Rope sway refers to oscillation of the hoist and/or compensation ropes in the elevator shaft. The oscillation can be a significant problem in a roped elevator system. The oscillation can be caused, for example, by vibration emanating from wind induced building deflection and/or the vibration of the ropes during operation of the elevator system. If the frequency of the vibrations approaches or enters a natural harmonic of the ropes, then the oscillation displacements can increase far greater than the displacements. In such situations, the ropes can tangle with other equipment in the elevator shaft, or as the elevator travels, come out of the grooves of the sheaves. If the elevator system use multiple ropes and the ropes oscillate out of phase with one another, then the ropes can become tangled with each other and the elevator system may be damaged.

Several conventional solutions use mechanical devices connected to the ropes to estimate the displacement of the ropes. For example, one solution uses a device attached to a compensating rope sheave assembly in an elevator system to detect rope sway exceeding a certain magnitude. However, a mechanical device attached to a compensating rope is difficult to install and maintain.

Another method uses displacement and the natural frequency of the building for estimating and computing the amount of sway of the rope. This method is general and may not provide precise estimation of the rope sway.

Accordingly, there is a need to improve an estimation of a rope sway suitable for the estimation of the rope sway in real time.

SUMMARY OF THE INVENTION

It is an object of an invention to provide a method for measuring a lateral sway of an elevator rope of an elevator system. It is further object of the invention to provide a method for measuring a lateral sway using sensors placed within an elevator shaft.

It is a further object of the invention to provide a method for determining an optimal number and positions of the sensors. Moreover, another object of the invention is to determine the number and the positions of the sensors in advance without operating actual elevator system.

Embodiments of the invention are based on a realization that an operation of the elevator system can be simulated with a model of the elevator system to determine a simulation of an actual shape of the elevator rope caused by the operation. The embodiments are resulted from another realization that positions of the sensors for sensing the sway can be tested by determining an estimated shape of the elevator rope using an interpolation between locations of the points in the elevator shaft configured to be sensed by the sensors and comparing the estimated shape of the elevator rope with the simulation of an actual shape of the elevator rope. The points that optimize an error between the estimated and the actual shape of the rope having lateral sway can be used for positioning the sensors in the elevator system.

Furthermore, during the operation of the elevator system that uses sensors arranged to sense the motion of the rope at the locations of the points determined by the embodiments of the invention, the shape of the rope caused by the sway can be determined by sensing the sway at the locations of the points, and by interpolating locations of the points, e.g., using a curve fitting or a B-spline interpolation.

Typically, the sway of the elevator rope is determined between two boundaries. For example, the elevator rope connects an elevator car with a pulley, and one embodiment measures the sway of the elevator rope between corresponding connections of the rope with the elevator car and the pulley. Therefore, in one embodiment, two boundary sensors are arranged into the elevator system, and incorporated in the model of the elevator system. For example, a first boundary sensor is configured to measure a lateral motion of the elevator car, and a second boundary sensor is configured to measure a lateral motion of the pulley. This embodiment determines a position of the sensor, i.e., a sway sensor, by interpolation of locations measured by the boundary sensors and a location of the point that optimizes the error, e.g., minimizes the error.

Accordingly, one embodiment discloses a method for determining a position of at least one sway sensor in an elevator system for sensing a lateral motion of an elevator rope between a first boundary location and a second boundary location, comprising steps of: simulating an operation of the elevator system with a model of the elevator system to produce an actual shape of the elevator rope caused by the operation; determining at least one sway location, such that an error between the actual shape of the elevator rope and an estimated shape of the elevator rope is minimized, wherein the estimated shape of the elevator rope is determined by interpolation of the first boundary location, the second boundary location, and the sway location; and determining the position of the sway sensor, such that the sway sensor senses the lateral motion of the elevator rope at the sway location.

Another embodiment discloses a system for determining a sway location between a first boundary location and a second boundary location for sensing a lateral motion of an elevator rope in an elevator system, comprising: a processor configured to simulate an operation of the elevator system with a model of the elevator system to produce an actual shape of the elevator rope caused by the operation, and to determined the sway location, such that an error between the actual shape of the elevator rope and an estimated shape of the elevator rope is minimized, wherein the estimated shape of the elevator rope is determined by interpolation of the first boundary location, the second boundary location, and the sway location.

In various embodiments, the simulating operation is repeated for different conditions of disturbance to produce a set of sway locations. In those embodiments, the sway location can be determined based on the set of sway location. For example, one embodiment averages the locations in the set of sway location to produce the sway location to be sensed. Additionally or alternatively, the set or subset of the sway locations can be used to determine the positions of multiple sway sensors.

One embodiment determines iteratively a set of sway locations until the error between the actual shape of the elevator rope and the estimated shape of the elevator rope is less than a predetermined threshold. This embodiment determines the estimated shape of the elevator rope by interpolation of the first location, the second location, and locations in the set of sway locations.

For example, one variation of this embodiment determines one sway location that minimizes the error, i.e., a size of the set of the sway locations is one. If even after the optimization, then the error is greater that the threshold, then the size of the set of the swept locations is increased, e.g., by one, and the error is optimized again to determine the set of sway locations, e.g., two sway locations. The optimization is repeated iteratively until the set of the say locations includes maximum number of locations or until the error becomes less than the predetermined threshold.

Some embodiments determine the sway location based on a non-linear optimization of the error under constraints. For example, one embodiment selects an initial set of sway locations on the actual shape of the elevator rope, and determines, for each location in the initial set, the error between the actual shape of the elevator rope and the estimated shape of the elevator rope determined separately for each location in the initial set. The location corresponding to a minimum error is selected as the sway location.

Another embodiment formulates a cost function of a time of the simulation, a length of the elevator rope between the first boundary sensor and the second boundary sensor, the error, and a function of conditions of disturbance, and determines the sway location, such that a result of the cost function is minimized.

Another embodiment of an invention discloses a method for determining a sway of an elevator rope during an operation of an elevator system. The method includes acquiring at least one measurement of a motion of the elevator rope during the operation of the elevator system and determining the sway of the elevator rope connecting an elevator car and a pulley based on an interpolation between boundaries of the elevator rope based on the measurement of the motion.

This embodiment may optionally include approximating the sway of the elevator rope based on the measurement of the motion and a model of the elevator system. For example, the measurement can be a sway measurement of the motion of the elevator rope at a sway location, and the determining may include determining the sway using the interpolation based on boundary measurements and the sway measurement. In some variations, the boundary measurements includes a first boundary measurement and a second boundary measurement, and the method further may include receiving a first boundary measurement from a first boundary sensor; and determining a second boundary measurement based on the first boundary measurement.

Various embodiments may use different methods for determining the measurement of the motion. For example, one embodiment may determine the measurement of the motion at a location based on the sensing of the motion at the location. Another embodiment may determine the measurement of the motion at a location based on the sensing of the motion at another location. For example, one embodiment may approximate the measurement based on a previous measurement and optionally can use at least one of a boundary measurement, a previous boundary measurement, and a model of the elevator system.

Some embodiments may interpolate the sway of the elevator rope by an approximation based on the boundary measurements, and the sway measurement or based on a model of the elevator system. One embodiment may determine the measurement of the motion at a location based on the sensing of the motion by a plurality of sway sensors placed horizontally with respect to an elevator shaft.

Another embodiment may approximate the sway of the elevator rope based on a model of the elevator system using the measurement as an initial condition. For example, the model may be defined by ordinary differential equations (ODE), and the ODE may be solved starting from the initial condition. Alternative embodiment defines the model by a partial differential equation (PDE) and solves the PDE starting from the initial condition.

Another embodiment of the invention discloses a computer program product for determining a sway of an elevator rope connecting an elevator car and a pulley in an elevator system, wherein the computer program product modifies a processor. The computer program product includes a computer readable storage medium comprising computer usable program code embodied therewith, wherein the program code executed by the processor determines the sway of the elevator rope based on a measurement of a motion of the elevator rope at a location and an auxiliary information selected from a group consisting of a model of the elevator system and an interpolation between boundaries of the elevator rope.

Yet another embodiment of the invention discloses a computer system for determining a sway of an elevator rope during an operation of an elevator system, including a processor configured for: determining boundary measurements of a motion of the elevator rope at a first boundary location and at a second boundary location; determining a sway measurement of the motion of the elevator rope at a sway location; determining, at a first instant of time, the sway of the elevator rope by an interpolation based on the boundary measurements, and the sway measurement; and determining, at a second instant of time, the sway of the elevator rope by an approximation based on the boundary measurements, and the sway measurement, and a model of the elevator system.

DETAILED DESCRIPTION OF THE PREFERRED EMBODIMENT

Figure 1:
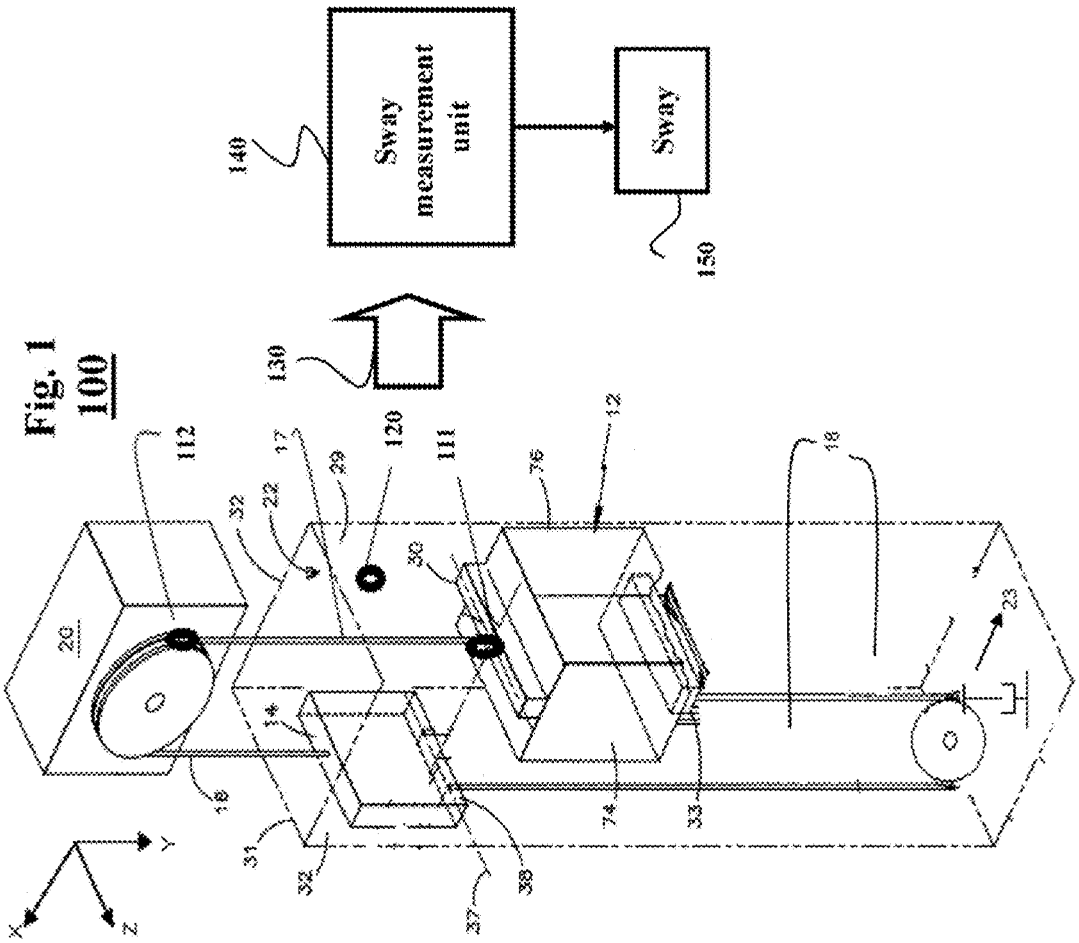
FIG. 1 is a schematic of an example elevator system in which the embodiments of the invention operate.

FIG. 1 shows an example elevator system 100 according to one embodiment of an invention. The elevator system includes an elevator car 12 connected by at least one elevator rope to different components of the elevator system. For example, the elevator car and a counterweight 14 attached to one another by main ropes 16-17, and compensating ropes 18. The elevator car 12 can include a crosshead 30 and a safety plank 33, as known in the art. A pulley 20 for moving the elevator car 12 and the counterweight 14 through an elevator shaft 22 can be located in a machine room (not shown) at the top (or bottom) of the elevator shaft 22. The elevator system can also include a compensating pulley 23. An elevator shaft 22 includes a front wall 29, a back wall 31, and a pair of side walls 32.

The elevator car and the counterweight can have a center of gravity which is defined as a point at which the summations of the moments in the x, y, and z directions about that point equal zero. In other words, the car 12 or counterweight 14 could theoretically be supported at the point of the center of gravity (x, y, z), and be balanced, because all of the moments surrounding this point are cancel out. The main ropes 16-17 typically are attached to the crosshead 30 of the elevator car 12 at a point where the coordinates of the center of gravity of the car are projected. The main ropes 16-17 are similarly attached to the top of the counterweight 14 at a point where the coordinates of the center of gravity of the counterweight 14 are projected.

During the operation of the elevator system, different components of the system are subjected to internal and external disturbance, e.g., a force of wind, resulting in lateral motion of the components. Such lateral motion of the components can result in a sway of the elevator rope that needs to be measured. Accordingly, a set of sensors is arranged in the elevator system to determine a lateral sway of the elevator rope.

The set of sensors may include boundary sensors 111 and 112, and at least one sway sensor 120. For example, a first boundary sensor 111 is configured to measure a first boundary location of a lateral motion of the elevator car, a second boundary sensor 112 is configured to measure a second boundary location of a lateral motion of the pulley, and the sway sensor 120 is configured to sense a lateral sway of the elevator rope at a sway location associated with a position of the sway sensor.

For example, the position of the first boundary sensor coincides with the first boundary location, the position of the second boundary sensor coincides with the second boundary location, and the position of the sway boundary sensor coincides with the sway location. However, in various embodiments, the sensors can be arranged in different positions such that the first, second and the sway locations are properly sensed and/or measured. The actual positions of the sensors can depend on the type of the sensors used. For example, the boundary sensors can be linear position sensors, the sway sensor can be any motion sensor, e.g., a light beam sensor.

During the operation of the elevator system the first boundary, the second boundary and the sway locations are determined and transmitted 130 to a sway measurement unit 140. The sway measurement unit determines the sway 150 of the elevator rope by, e.g., interpolating the first location, the second location, and the sway location. Various embodiments use different interpolating techniques, e.g., a curve fitting or a B-spline interpolation.

In one embodiment, the boundary sensors are removed and only the sway sensors are used to determine the sway of the rope relatively to the neutral position of the rope corresponding to the initial rope configuration, i.e. no rope sway.

Determining Position of Sway Sensor

Embodiments of the invention are based on a realization that an operation of the elevator system can be simulated with a model of the elevator system to determine a simulation of the actual sway of the elevator rope caused by the operation. The embodiments are resulted from another realization that positions of the sensors for sensing the sway can be tested by determining an estimated sway of the elevator rope using an interpolation between locations of the points in the elevator shaft configured to be sensed by the sensors and comparing the estimated sway of the elevator rope with the simulation of an actual sway of the elevator rope. The points that optimize an error between the estimated and the actual sway of the rope having lateral sway can be used for positioning the sensors in the elevator system.

Figure 2:
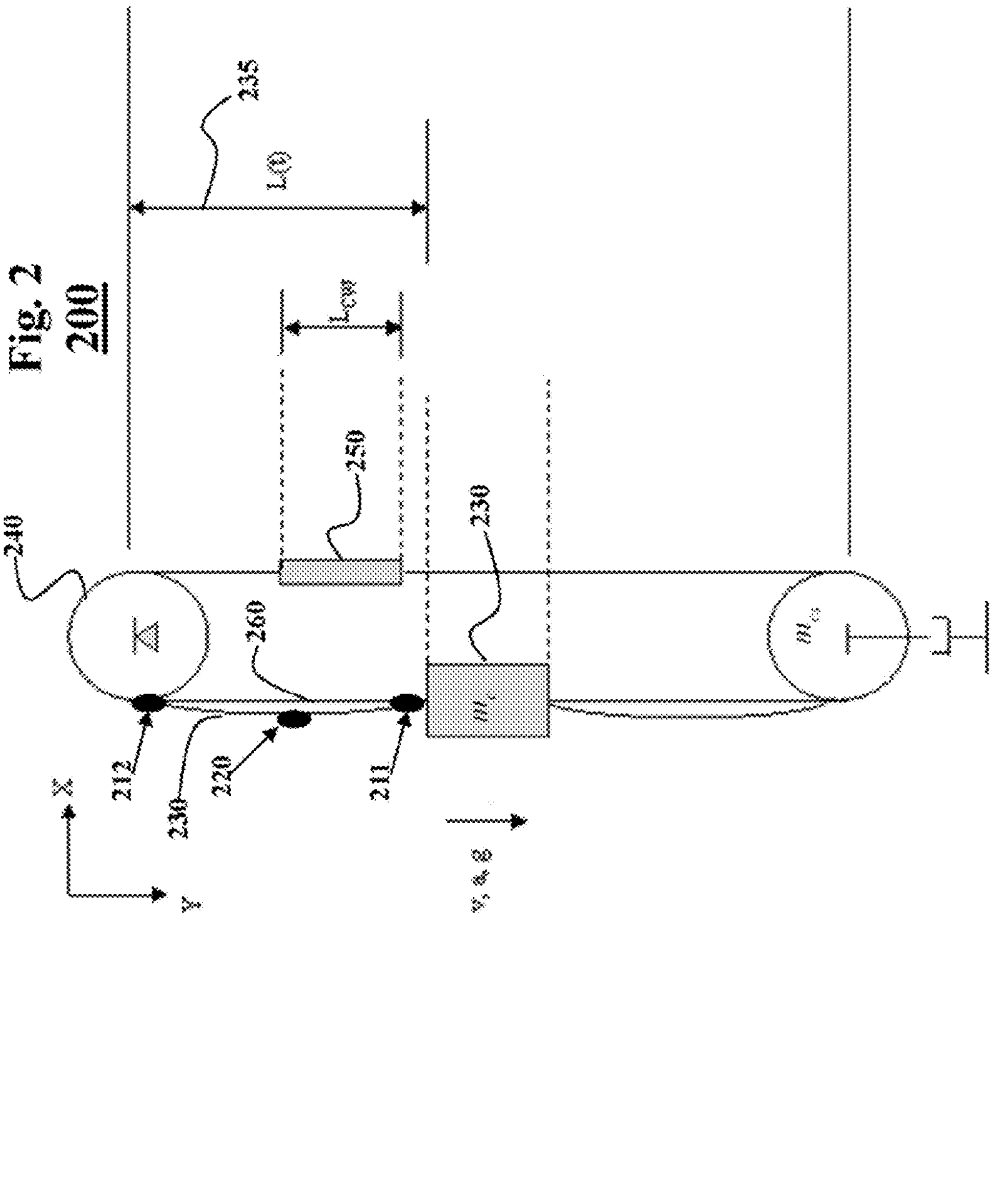
FIG. 2 is a schematic of a model of the elevator system according an embodiment of an invention.

FIG. 2 shows an example of a model 200 of the elevator system 100. The model 200 is determined based on parameters of the elevator systems. Various systems known in the art can be used to simulate operation of the elevator system with the model of the elevator system to produce an actual sway 230 of the elevator rope caused by the operation.

The simulation of the operation of the elevator system can also produce a first boundary location 211 and a second boundary location 212 because the lateral motion of the components of the elevator system, e.g., the elevator car and the pulley, can be determined based on the condition of the disturbance. However, an optimal placement of a sway sensor to sense a motion in a sway location 220 needs to be determined.

One embodiment performs the modeling based on Newton's second law. For example, the elevator rope is modeled as a string and the elevator car and the counterweight are modeled as rigid body 230 and 250, respectively. The model of the elevator system is determined by a partial differential equation according to $$\rho\left(\frac{\partial^2}{\partial t^2}+v^2(t)\frac{\partial^2}{\partial y^2}+2v(t)\frac{\partial}{\partial y\partial t}+a\frac{\partial}{\partial y}\right)u(y,t)-\frac{\partial}{\partial y}T(y)\frac{\partial u(y,t)}{\partial y}+c(y)\left(\frac{\partial}{\partial t}+v(t)\frac{\partial}{\partial y}\right)u(y,t)=0, \tag{1}$$

wherein $$\frac{\partial^i}{\partial V^i}(s(V))$$

is a derivative of order i of a function s(.) with respect to its variable V, t is a time, y is a vertical coordinate, e.g., in an inertial frame, u is a lateral displacement of the rope along the x axes, ρ is the mass of the rope per unit length, T is the tension in the elevator rope which changes depending on a type of the elevator rope, i.e. main rope, compensation rope, c is a damping coefficient of the elevator rope per unit length, v is the elevator/rope velocity, a is the elevator/rope acceleration.

Under the two boundary conditions $$u(0,t)=f_1(t)$$

$$u(l(t),t)=f_2(t), \text{ and}$$

$f_1(t)$ is the first boundary location measured by the first boundary sensor 111, $f_2(t)$ is the second boundary location measured by the second boundary sensor 112, l(t) is the length of the elevator rope 17 between the first and the second boundary sensors.

For example, a tension of the elevator rope can be determined according to $$T=(m_e+\rho(L(t)-y))(g+a(t))+0.5m_{cs}g$$

wherein $m_e$, $m_{cs}$ are the mass of the elevator car and the pulley 240 respectively, and g is the gravity acceleration, i.e., g=9.8 m/s$^2$.

In one embodiment, the partial differential Equation (1) is discretized to obtain the model based on ordinary differential equation (ODE) according to $$M\ddot{q}+(C+G)\dot{q}+(K+H)q=F(t), \quad (2)$$

wherein q=[q1, qN] is a Lagrangian coordinate vector, $\dot{q}$, $\ddot{q}$ are the first and second derivatives of the Lagrangian coordinate vector with respect to time. N is a number of vibration modes. The Lagrangian variable vector q defines the lateral displacement u(y, t) by $$u(y,t)=\sum_{j=1}^{j=N} q_j(t)\psi_j(y,t)+\frac{l-y}{l}f_1(t)+\frac{y}{l}f_2(t)$$

$$\psi_j(y,t)=\frac{\phi_j(\xi)}{\sqrt{l(t)}}$$

wherein $\phi_j(\xi)$ is a $j^{th}$ sway function of the dimensionless variable $\xi=y/l$.

In Equation (2), M is an inertial matrix, (C+G) constructed by combining a centrifugal matrix and a Coriolis matrix, (K+H) is a stiffness matrix and F(t) is a vector of external forces. The elements of these matrices and vector are given by:

$$M_{ij}=\rho\delta_{ij}$$

$$K_{ij}=\frac{1}{4}\rho l^{-2}\dot{l}^2\delta_{ij}-\rho l^{-2}\dot{l}^2\int_0^1(1-\xi)^2\phi_i'(\xi)\phi_j'(\xi)\,d\xi+\rho l^{-1}(g+\ddot{l})\int_0^1(1-\xi)\phi_i'(\xi)\phi_j'(\xi)\,d\xi+m_e l^{-2}(g+\ddot{l})\int_0^1\phi_i'(\xi)\phi_j'(\xi)\,d\xi+\frac{1}{2}M_{cs}gl^{-2}\int_0^1\phi_i'(\xi)\phi_j'(\xi)\,d\xi$$

$$H_{ij}=\rho(l^{-2}\dot{l}^2-l^{-1}\ddot{l})\left(\frac{1}{2}\delta_{ij}-\int_0^1(1-\xi)\phi_i(\xi)\phi_j'(\xi)\,d\xi\right)-c_p\dot{l}l^{-1}\left(\int_0^1\phi_i(\xi)\phi_j'(\xi)\,d\xi+0.5\delta_{ij}\right)$$

$$G_{ij}=\rho l^{-1}\dot{l}\left(2\int_0^1(1-\xi)\phi_i(\xi)\phi_j'(\xi)\,d\xi-\delta_{ij}\right)$$

$$C_{ij}=c_p\delta_{ij}$$

-continued $$F_i(t)=-l\sqrt{l}\,(\rho s_1(t)+c_p s_4(t))\int_0^1\phi_i(\xi)\xi\,d\xi+\sqrt{l}\,(s_5(t)-\rho f_1^{(2)}(t))\int_0^1\phi_i(\xi)\,d\xi$$

$$s_5(t)=-2v\rho s_2(t)-g(t)s_3(t)-c_p f_1^{(2)}$$

$$s_1(t)=\frac{l\ddot{l}-2\dot{l}^2}{l^3}f_1(t)+\frac{\dot{l}}{l^2}\dot{f}_1(t)+\frac{\dot{l}}{l^2}\dot{f}_1(t)+\frac{1}{l^4}\left(l^3f_2^{(2)}(t)-f_2(t)l^2l^{(2)}+2l\dot{l}^2f_2(t)-2l^2\dot{l}\dot{f}_2(t)\right)-\frac{\ddot{f}_1(t)}{l}$$

$$s_2(t)=\frac{\dot{l}}{l^2}f_1(t)-\frac{\dot{f}_1}{l}+\frac{\dot{f}_2}{l}-f_2\frac{\dot{l}}{l^2}$$

$$s_3(t)=\frac{f_2(t)-f_1(t)}{l}$$

$$s_4(t)=\frac{\dot{l}}{l^2}f_1(t)-\frac{\dot{f}_1}{l}+\frac{\dot{f}_2l-f_2\dot{l}}{l^2}$$

$$\phi_i(\xi)=\sqrt{2}\sin(\pi i\xi),\ \delta_{ij}\ \text{(kronecker delta)}$$

wherein $\dot{s}(.)$ is a first derivative of a function s with respect to its variable, the notation $s^{(2)}(.)$ is a second derivative of the function s with respect to its variable, and $$\int_{v0}^{vf}s(v)\,dv$$

is an integral of the function s with respect to its variable v over the interval $[v_0, v_f]$. The Kronecker delta is a function of two variables, which is 1 if the variables are equal and 0 otherwise.

The system models given by Equation (1) and Equation (2) are two examples of models of the system. Other models based on a different theory, e.g., a beam theory, instead of a string theory, can be used by the embodiments of the invention.

Figure 3:
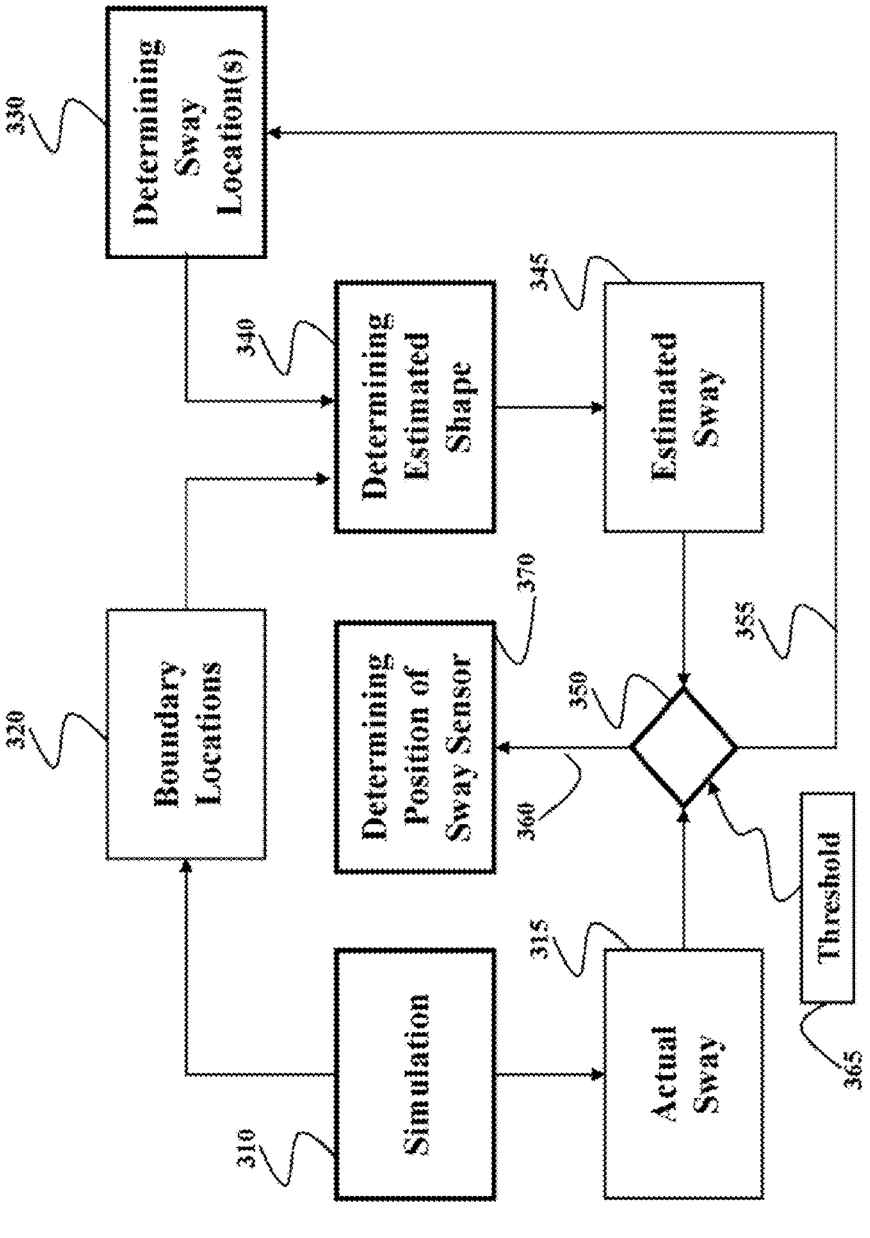
FIG. 3 is a block diagram of a method for determining a position of at least one sway sensor according an embodiment of an invention.

FIG. 3 shows a block diagram of a method for determining the position of at least one sway sensor for sensing the lateral motion of the elevator rope at the sway location to facilitate a measurement of a lateral sway of an elevator rope according an embodiment of the invention. The method is implemented using a processor, e.g., a processor 300, as known in the art.

A simulation 310 of operation of the elevator system with a model of the elevator system produces an actual sway 315 of the elevator rope caused during the operation of the elevator system. Also, the simulation produces boundary locations 320, i.e., the first boundary location and the second boundary location. A sway location 330 is determined initially, and estimated sway 345 is determined by interpolation of the boundary locations and the sway location. If an error 350 between the actual sway 315 of the elevator rope and the estimated sway 345 of the elevator rope is not optimal 355, then the determination of the sway location is repeated until the error is minimized 360. In one embodiment, the error is minimized when the error is less than a threshold 365.

After at least one sway location that optimizes the error is determined, a position 370 of the sway sensor is determined such that the sway sensor senses the lateral motion of the elevator rope at the sway location.

One embodiment determines iteratively a set of sway locations until the error between the actual sway of the elevator rope and the estimated sway of the elevator rope is less than a threshold. This embodiment determines the estimated sway of the elevator rope by interpolation of the first location, the second location, and locations in the set of sway locations. A relative rope sway can also be determined by interpolating only the set of sway locations.

For example, one variation of this embodiment determines one sway location that optimizes the error, i.e., a size of the set of the sway locations is one. If after the optimization, the error is greater that the threshold, then the size of the set of the swept locations is increased, e.g., by one, and the error is determine using the updated set of sway locations, e.g., two sway locations. The optimization is repeated iteratively until the set of the way locations includes a maximum number of locations or until the error becomes less than the threshold.

Figure 4A:
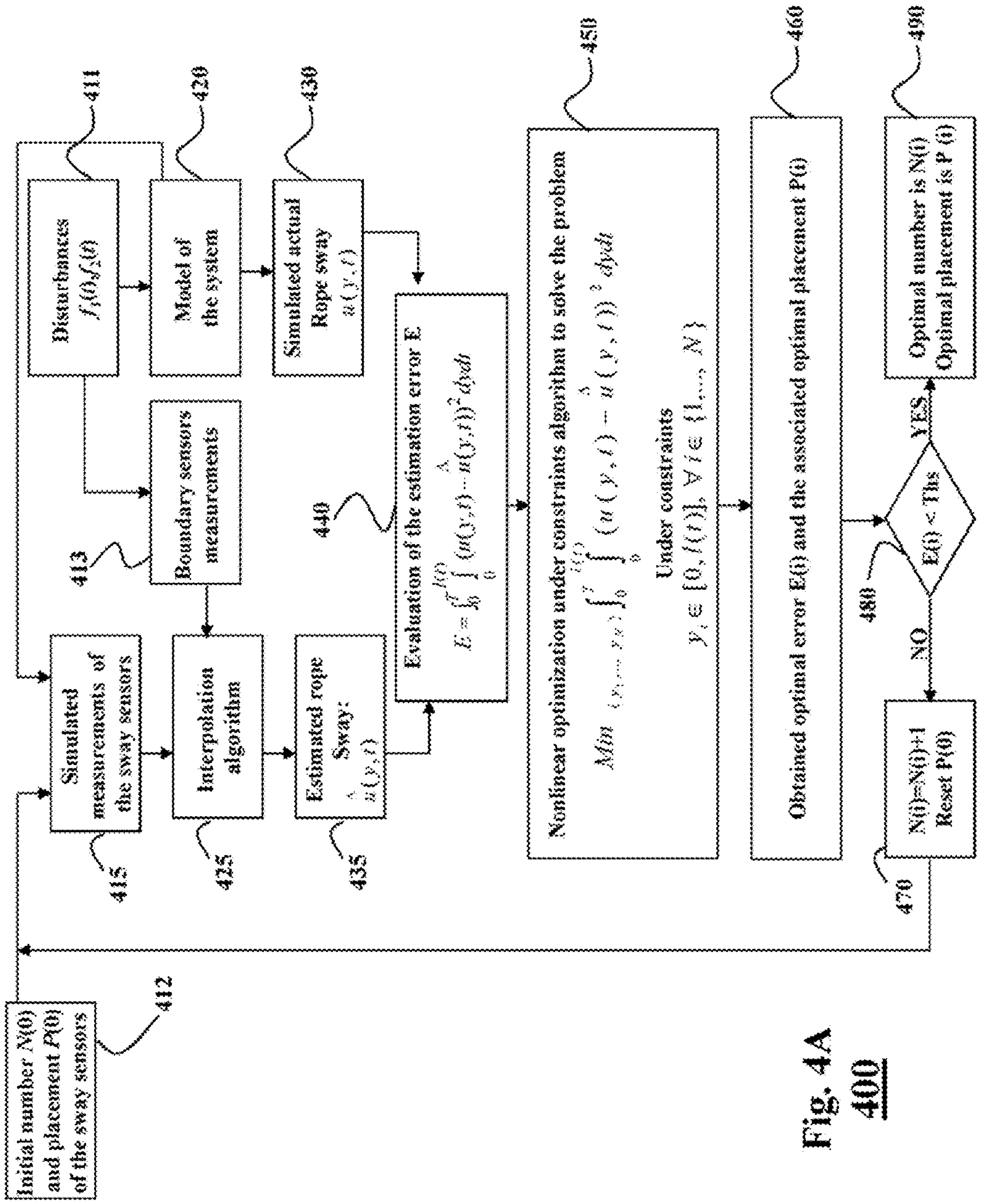
FIG. 4A is a block diagram of a method for determining a number and positions of a set of the sway sensors according an embodiment of an invention.

FIG. 4A shows a block diagram of a method 400 for determining a number and positions of a set of the sway sensors according another embodiment of the invention. Inputs to the method are a set 411 of conditions of the disturbance and an initial number N(0) and an initial set P(0) of the sway locations 412.

For example, the set of condition of disturbance includes two disturbance functions $f_1(t)$ and $f_2(t)$. An example of initial number of sway sensors is one, and an example of initial placement of the sway sensor is L/2, wherein L is the length 235 of the elevator rope 230.

The method simulates the ODE model 420 of the elevator system over time T. The simulation of the model produces a simulation of the actual sway 430 of the elevator rope over time, i.e., a rope sway u(y,t).

An interpolation 425 interpolates the measurements 413 of the boundary sensors $sb_1$, $sb_2$ and the measurements 415 of the sway sensors to produce an estimated ("^") sway of the rope sway $\hat{u}(y, t)$ 435. The interpolation can be B-spline interpolation. The interpolation can also be done without the boundary sensors measurements 413 to estimate a relative rope sway.

The simulated actual sway u(y, t) and the estimated sway $\hat{u}(y, t)$ are used to evaluate 440 the error cost function defined by, $$E = \int_0^T \int_0^{l(t)} \left(u(y, t) - \hat{u}(y, t)\right)^2 dy\,dt \tag{3}$$

wherein T is a time period of the simulation.

Some embodiments determine the sway location based on a non-linear optimization of the error under constraints. For example, one embodiment selects an initial set of sway locations on the actual sway of the elevator rope, and determines, for each location in the initial set, the error between the actual sway of the elevator rope and the estimated sway of the elevator rope determined separately for each location in the initial set. The location corresponding to a minimum error is selected as the sway location.

Another embodiment, uses the nonlinear optimization algorithm under constraints is used to minimize the estimation error given by Equation (3). The embodiment formulates a cost function 450 of a time of the simulation, a length of the elevator rope between the first boundary sensor and the second boundary sensor, the error, and a function of conditions of disturbance, and determines the sway location such that a result of the const function is minimized. For example, the cost function is $$Min_{(y_1, \ldots, y_N)} \int_0^T \int_0^{l(t)} \left(u(y, t) - \hat{u}(y, t)\right)^2 dy\,dt \tag{4}$$

under the constraints, $$y_i \in [0, l(t)], \forall i \in \{1, \ldots, N\}$$

where $\mathrm{Min}_{(v1, \ldots, vn)} C(v_1, \ldots, v_N)$ denotes the minimum of the cost function C with respect to a vector of variables $(v_1, \ldots, v_N)$.

The optimization 450 produces an optimal error E and the associated sway locations and placements P 460 of the sway sensors. The error E is compared 480 to a threshold Ths. If the error is less than the threshold, then the sway locations and placements P 460 of the sway sensors associated with the sway locations are selected 490. If the error is greater than the threshold, then the method adds 470 one more sway location into the set of sway locations, resets the initial locations and repeat the method iteratively until the set of the way locations includes maximum number of locations or until the error becomes less than the threshold.

Determining Horizontal Component of the Location of Sway Sensor

In some embodiments, the sway sensor is configured to sense a motion of the rope within a plane. Therefore, only one coordinate, e.g., a vertical coordinate, of the location of the sway sensor is determined. In one variation of this embodiment, an array of discrete sensors for sensing a motion within a line is used to simulate the sensing within the plane. However, some other embodiments limit a number of discrete sensors. Therefore, in those embodiments, a second coordinate, e.g., a horizontal coordinate of the location of the sway sensor, is determined.

Figure 4B:
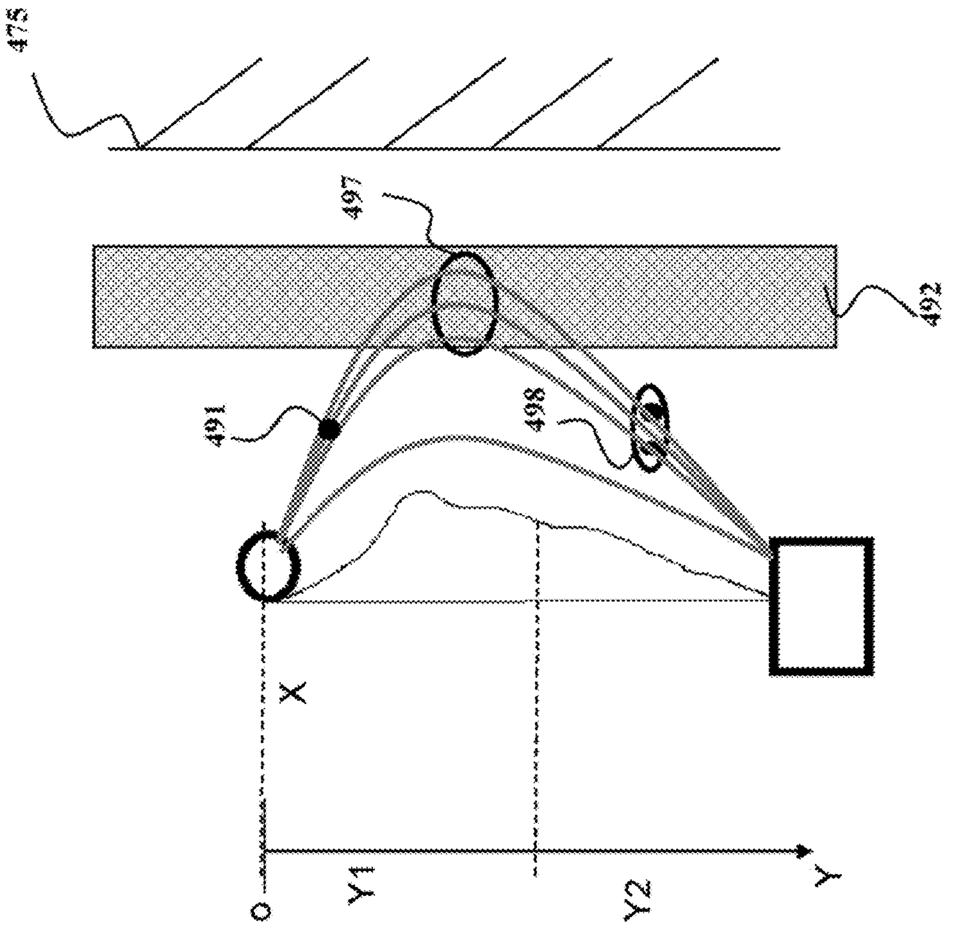
FIG. 4B is a schematic of a horizontal placement of the sensors within the elevator shaft.
Figure 4C:
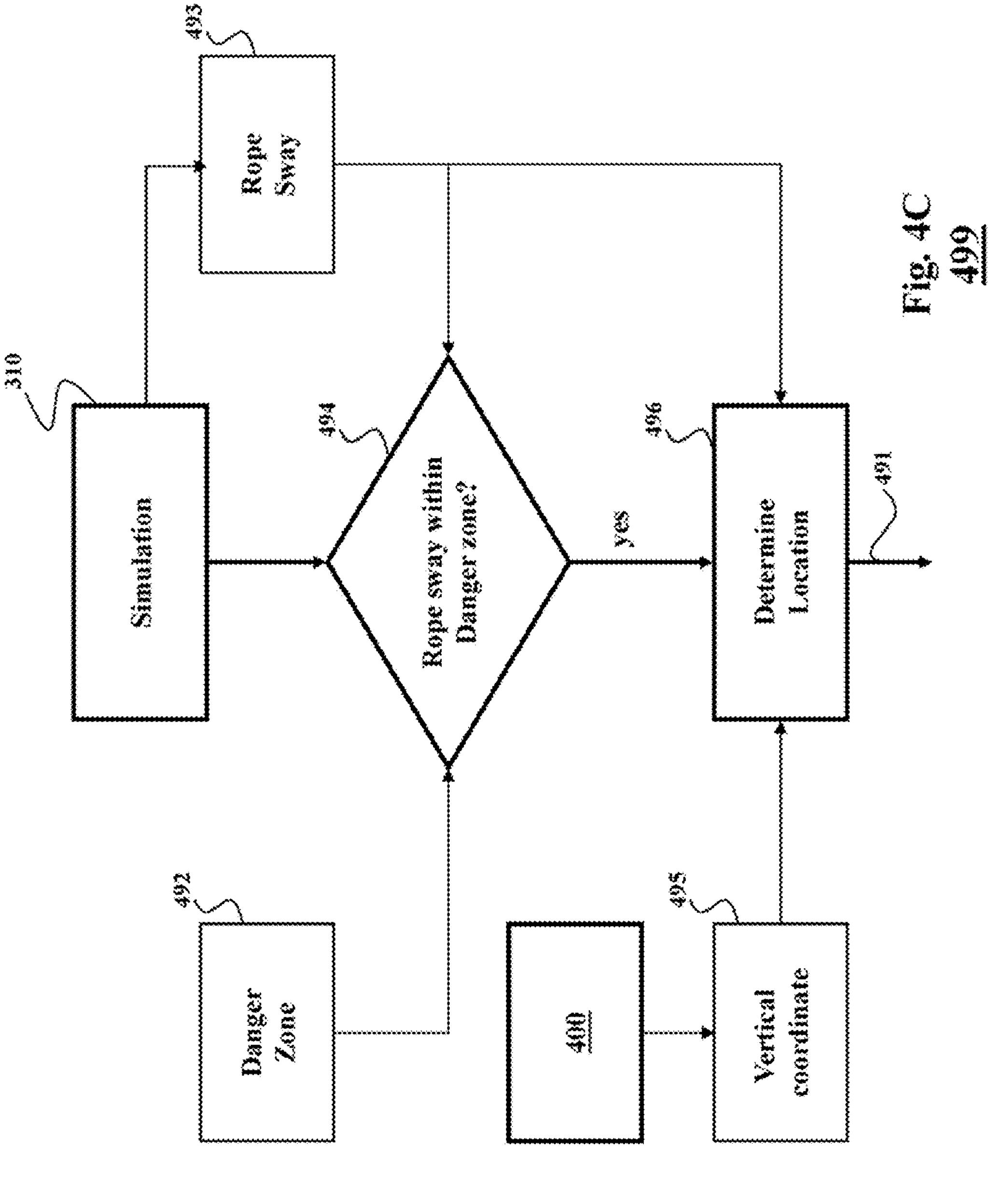
FIG. 4C is block diagram of a method for horizontal placement of the sensors within the elevator shaft.

FIGS. 4B-C show an example of an embodiment for determining horizontal coordinates of sway sensors having vertical coordinates determined by the method 400. This embodiment is based on a realization that a number of the sway sensors can be limited to those discrete sensors that sense the motion only when at least part of the rope enters a danger zone 492 due to the sway of the rope. An example of the danger zone is a zone close to a wall 475 of the elevator shaft, which can be defined by a distance to the wall.

For example, the sway of the elevator rope is simulated 310 using the model of the system 200 to determine amplitude 493 of the sway of the rope during the simulation time. If amplitude 493 indicates 494 that rope enters the danger zone 492, then the location of the discrete sway sensor sensing a line is determined 496 such that vertical coordinate 495 is provided by the method 400 and a horizontal coordinate 491 corresponds to the sway 494 at the vertical coordinate. In one variation of this embodiment, the sway zone 498 corresponding to various sensing 497 of the motion of the rope in the danger zone 492 is determined using method 499, and the discrete sway sensors are placed in the sway zone uniformly.

Figure 5:
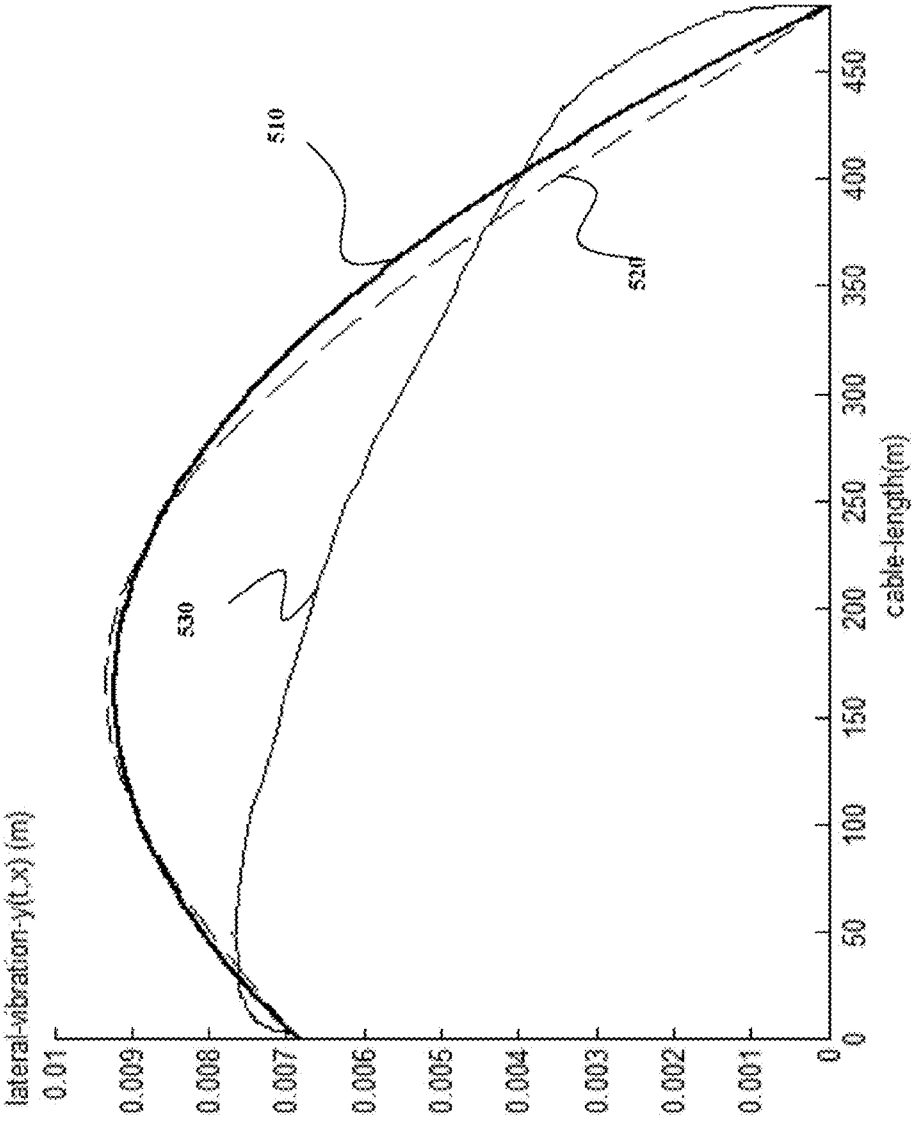
FIGS. 5-6 are graphs of lateral vibration of an elevator rope as a function of rope length.

FIG. 5 shows a graph of the sway of the elevator rope, in terms of lateral vibration as a function of cable length. The actual sway of the elevator rope 510 is determined during the simulation. The estimated sways 520 and 530 are determined for different sway locations. As can be seen from the graph, the error between the actual sway and the estimated sway 520 is less, i.e., more optimal, than the error between the actual sway and the estimated sway 530. Accordingly, the sway location resulting in the estimated sway 520 is used to determine the position of the sway sensor.

Figure 6:
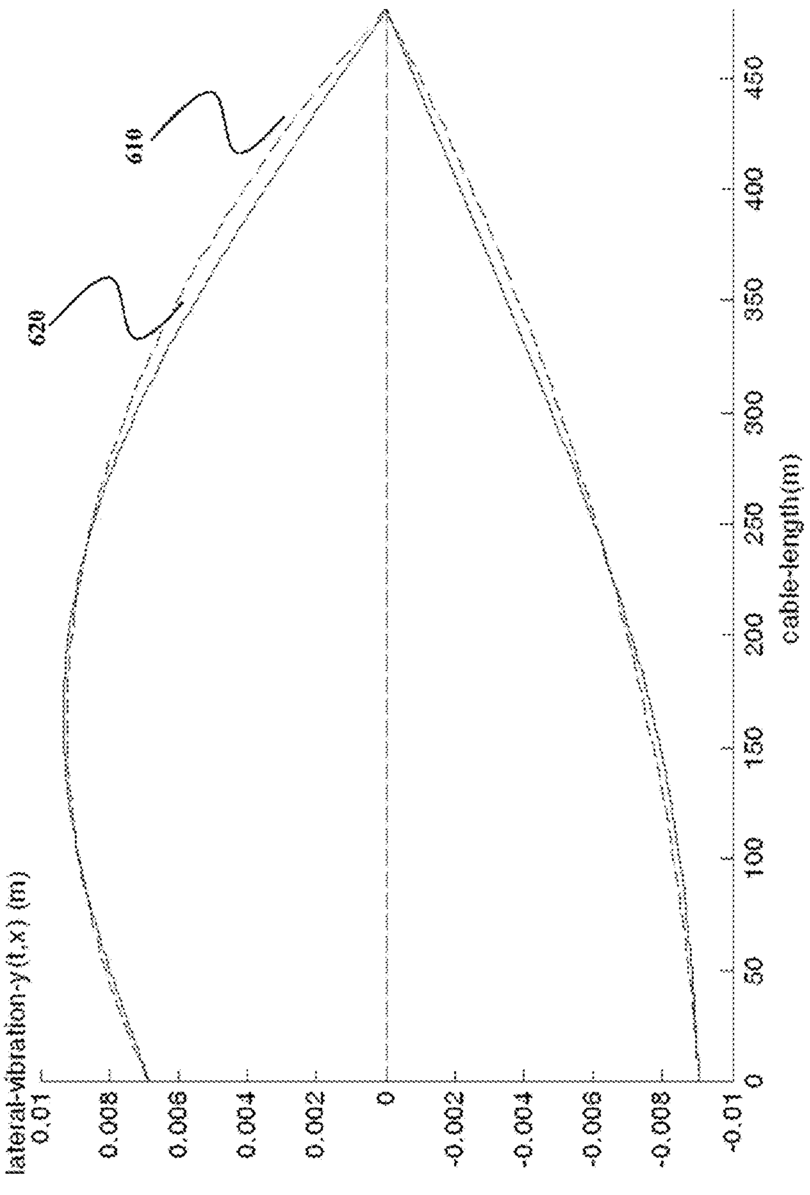

FIG. 6 shows a graph of the estimated shape of the elevator rope 610 and a graph of the actual shape 620 of the elevator rope determined during the simulation at time length of T=100/8 [sec]. As can be seen from FIG. 6, the estimated shape is similar to the actual shape of the elevator rope.

Therefore, some embodiments of the invention enable to optimize position of one or several sway sensors. Also, some embodiments enable to minimize a number of sway sensor required for determination of a sway of the elevator rope during the operation of the elevator system.

Sway Estimation

The sway sensor is placed in an elevator shaft of the elevator system, such as the system 100, to sense a lateral sway of the elevator rope at the sway location. The sensing of the lateral sway of the elevator rope is used to determine the sway of the elevator rope during the operation of the elevator system. In one embodiment, the sway sensor is placed to sense the sway location determined by the embodiments of the invention described above. In another embodiment, the sway location is arbitrarily. Additionally or alternatively, in one embodiment a set of sway sensors is placed to sense a set of sway locations arranged, e.g., vertically along the length of the elevator rope or horizontally, e.g., perpendicular to the elevator shaft.

Figure 7:
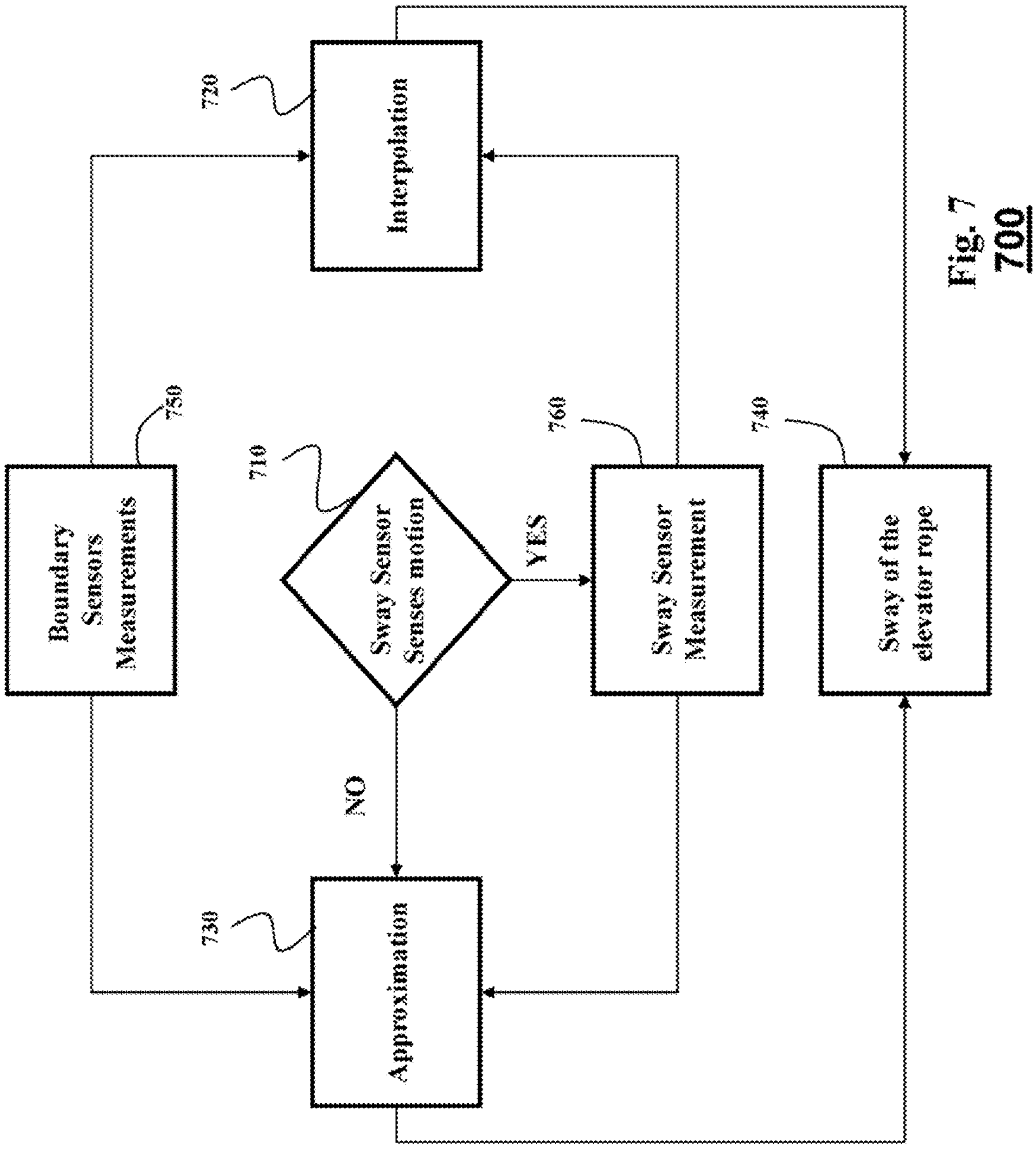
FIG. 7 is a block diagram of a method for determining the sway of the elevator rope during an operation of the elevator system in accordance with some embodiments of the invention.

FIG. 7 shows a method for determining the sway of the elevator rope during the operation of the elevator system in accordance with soiree embodiments of the invention. The elevator system may include at least one sway sensor placed in the elevator shaft and first and second boundary sensors placed, e.g., at the pulley and at the elevator car, respectively. The example of such elevator system is shown in FIG. 1.

The two boundary sensors can measure the displacement of the lateral motion of the pulley $f_1(t)$ and the lateral motion of the car $f_2(t)$ in real-time. The sway sensor can measure the motion of the elevator rope at the sway location at different time instants.

The second boundary sensor is optional and is removed in alternative embodiments. In those embodiments, only one boundary sensor is positioned near the top of the rope, e.g. at the pulley, and is used to measure the boundary signal $f_1(t)$. The displacement $f_2(t)$ at the other boundary is determined from the measurement $f_1(t)$. For example, the displacement $f_2(t)$ can be determined according to $$f_2(t) = f_1(t)\sin\left(\frac{\pi(H-y)}{2\pi}\right),\ y \in [1, H],$$

where H is the height of the elevator shaft, and y is a position where the second boundary measurement is determined. The position y can be determined based on a location of the elevator car at the elevator shaft.

When the sway sensor senses 710 a motion at the sway location, the sway 740 of the elevator rope is determined by the interpolation 720 based on boundary measurements 750 received from boundary sensors 750 and a sway measurement 760 received from the sway sensor. However, when the sway sensor does not sense the lateral motion, the sway 740 of the elevator rope is determined by approximation 730 based on the boundary measurements 750 and a previous sway measurement of the sway sensor 760. In some embodiments, the determination of the sway of the elevator rope is continuous while the elevator system operates.

Therefore, some embodiments of the invention enable determining of the sway of the elevator rope even if the sway sensor does not sense the lateral motion. Hence, the embodiments allow minimizing or optimizing a number of sway sensor used in the elevator system.

Figure 8:
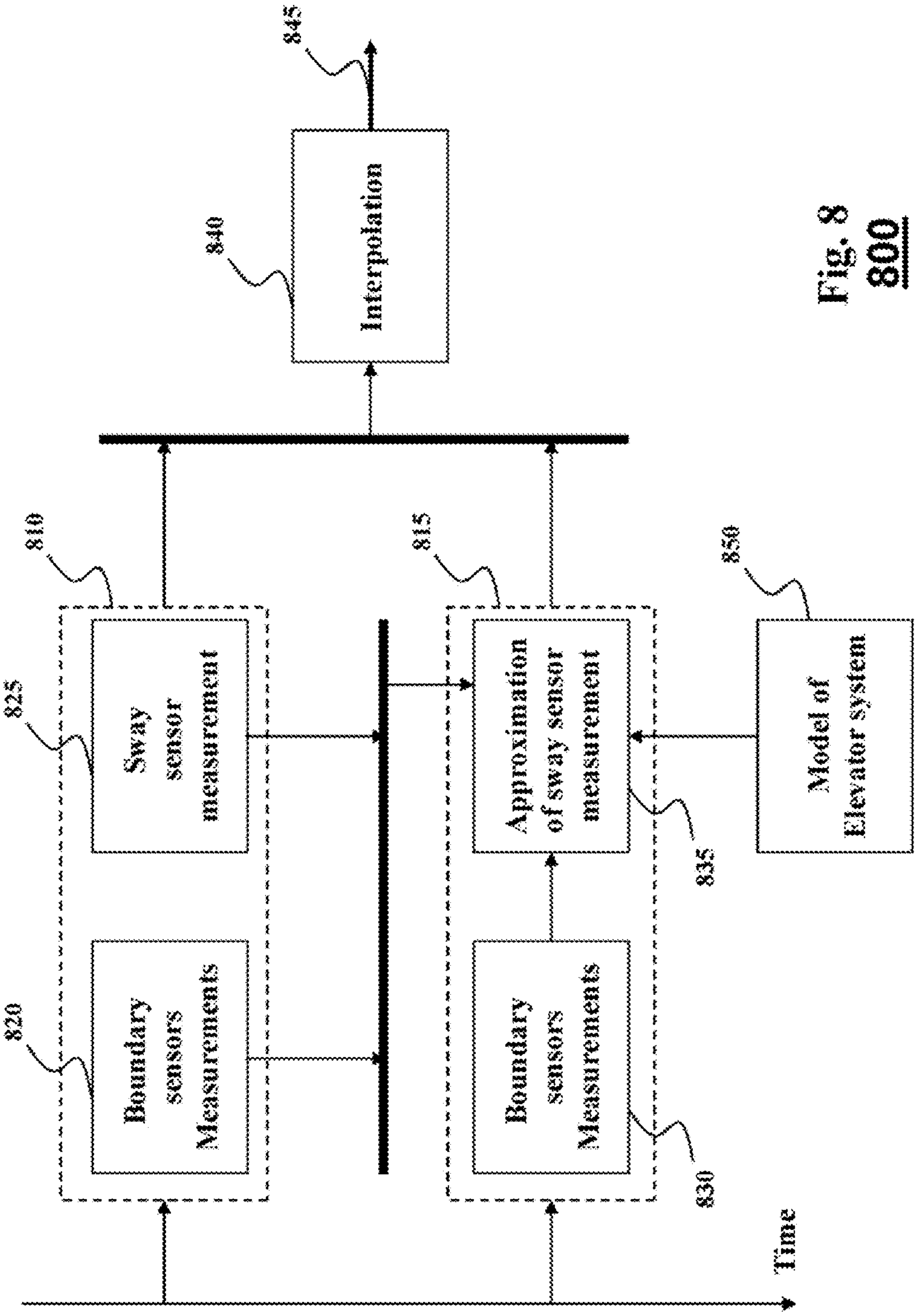
FIG. 8 is a block diagram of a system and a method for determining the actual sway of the elevator rope according to one embodiment of the invention.

FIG. 8 shows a block diagram of a system and a method for determining the actual sway of the elevator rope according one embodiment. The system and the method are implemented using a processor as known in the art. In this embodiment, the boundary sensors sense the lateral motion at the boundary locations at all time instances of the operation of the elevator system, e.g., at a first time instant t 810 and at a second time instant t+Δt 815. The sway sensor, however, senses the lateral motion at the sway location at the first time instant t, but does not sense the lateral motion at the second time instant t+Δt.

At the first time instant t, the sway of the sway rope 845 is determined by interpolation 840 of the measurements of the boundary sensors 820 and the sway sensor 825. At the second time instant t+Δt, the sway measurement of the sway sensor is approximated 835. The approximation 835 uses a previous sway measurement 825 of the sway sensor at the time instant t. In various embodiments, the approximation 835 also uses one or combination of previous measurements of the boundary sensors at the first time instant t, the measurements of the boundary sensors at the second time instant t+Δt, and the model 850 of the elevator system. After the sway measurement of the sway sensor is approximated, the actual sway of the sway rope is determined by the interpolation, as described above.

Accordingly, various embodiments of invention determine a sway of an elevator rope during an operation of an elevator system based on a measurement of the motion of the elevator rope in at least one location, e.g., a sway location or a boundary location, and an auxiliary information selected from a group consistent of a model of the system, a motion sensed at a boundary location, and a motion sensed at a sway location.

Figure 9:
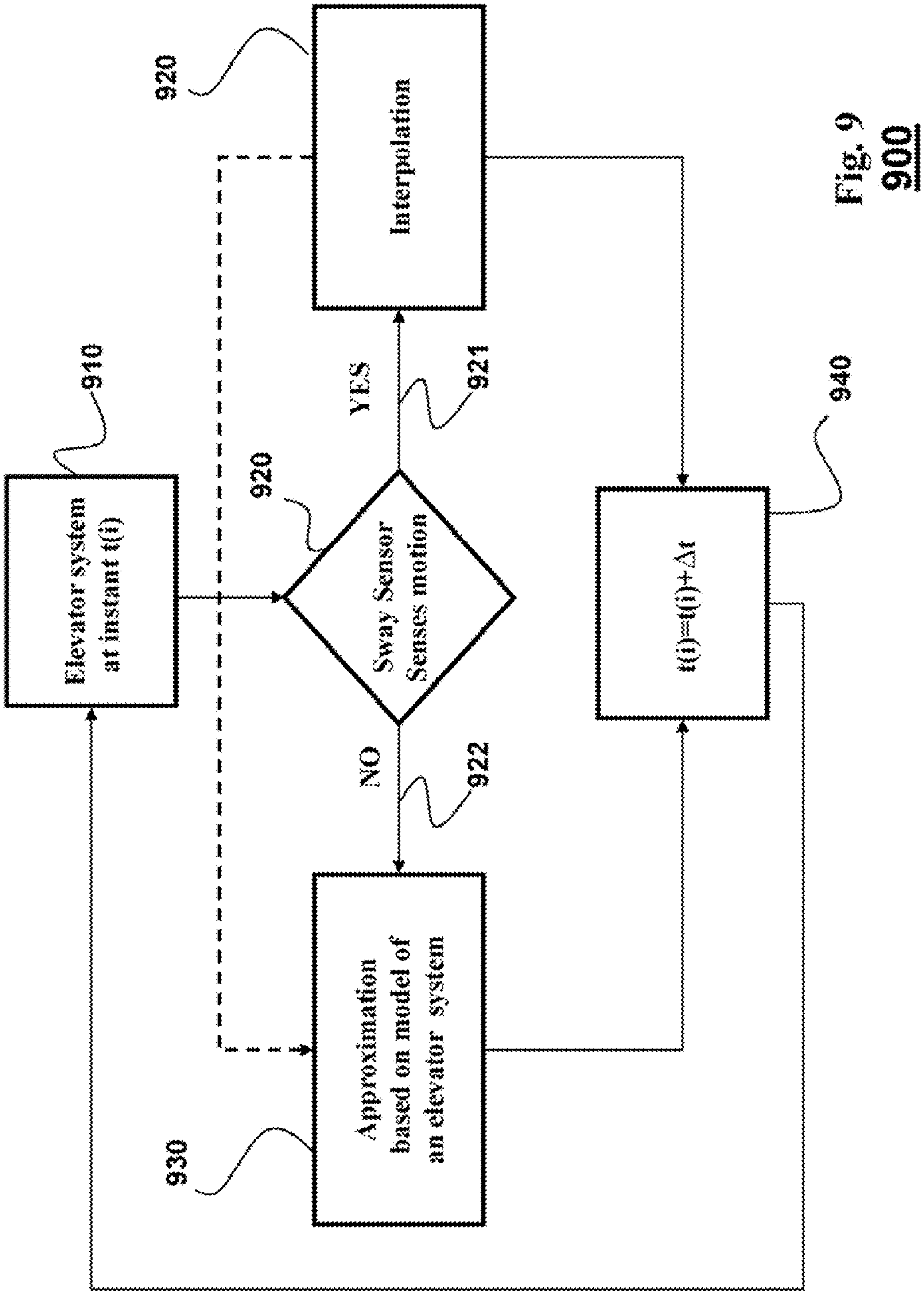
FIG. 9 is a block diagram of a method for determining the actual sway of the elevator rope according to another embodiment of the invention.

In another embodiment shown in FIG. 9, a state 910 of the elevator system is considered at the time instant t(i), measurements of the sway sensors are received 920, and if at least one sway sensor detects 921 the motion of the elevator rope, then the sway of the rope is estimated based on the interpolation. The interpolation 920 can use only sensed motion of the sway location to approximate other sway location for the sway sensor that did not sense the motion. For example, the sway of the elevator rope at the time instant t(i) is determined according to $$u(y,t(i)),\ \text{for all}\ y\epsilon[0,l(t(i)],$$

wherein y is a vertical coordinate in an inertial frame, u is a lateral displacement of the rope along the x axes, l is the length of the elevator rope between two boundary locations.

If none of the sway sensors detects 922 the motion of the elevator rope, the sway of the elevator rope is approximated 930 based on a model of the elevator system 910. The latest available measurements of the sway sensors are used by the model as initial conditions. The same operation is repeated 940 during a normal service of the elevator system. Various embodiments of the invention use different models of the elevator system and approximation methods.

Figure 10:
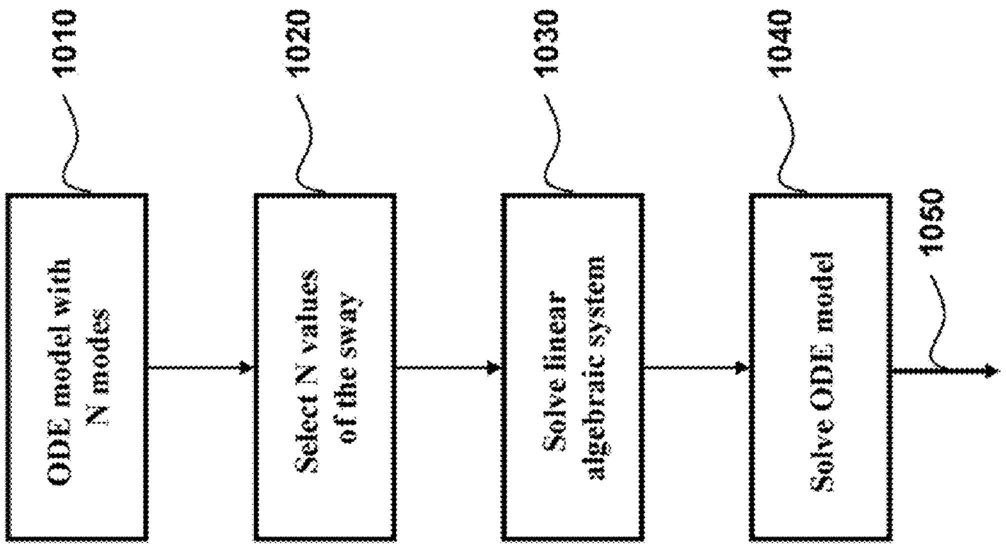
FIGS. 10-11 are flow charts of an implementation of the approximation method of FIG. 9 according to some embodiments of the invention.

FIG. 10 shows a flow chart of an implementation of the approximation method according one embodiment of the invention. The state of the elevator system is analyzed between two time instants t(i) and t(i+1), where at least one sway sensor detects the motion. For all instances of time t between the two time instants t(i) and t(i+1) none of the sway sensors detects the motion. At 1010, during time interval [t(i), t(i+1)], the ODE model with a set of N assumed modes of the elevator system is formulated. An example of the ODE model is given by Equation (2). At step 1020, the most recent available measurement of the motion of the elevator rope at the instant $1(i)$ is used to determine N different values of the sway motion at N different points y(j), j=1, . . . , N, along the length of the elevator rope.

Figure 12:
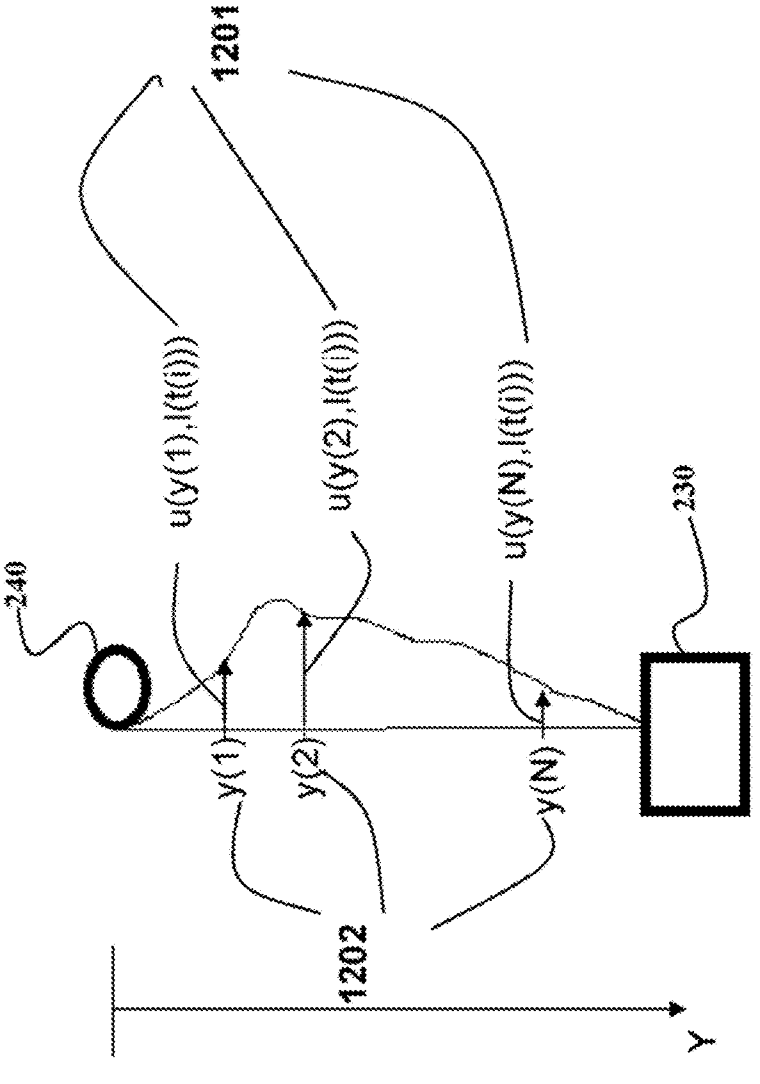
FIG. 12 is a block diagram of determining motion at different points of the elevator rope.

In one embodiment these N points can be determined by based on a previous sway of the elevator rope, e.g., by using N sway values u(y(j), l(t(i)) 1201 corresponding to N points y(j), j=1, . . . , N, which e.g., uniformly spread along the rope length 1202, as shown in FIG. 12. In another embodiment, the N points y(j), j=1, . . . , N can be selected randomly along the length of the elevator rope.

At 1030, The N different values together with the measurements of the boundary sensors at the instant t(i) are used to solve a linear algebraic system given by $$Q=\psi^{-1}(U-V),\ \psi_{\alpha,\beta}=\sqrt{2}\sin(\pi\beta y(\alpha)/l(t(i)))/l(t(i)) \tag{5}$$

$$U=[u(y(1),l(t(i))),\ \ldots\ ,u(y(N),l(t(i)))]^T$$

$$V=\left[\frac{l(t(i))-y(1)}{l(t(i))}f_1(t(i))+\frac{y(1)}{l(t(i))}f_2(t(i)),\ \ldots\ ,\frac{l(t(i))-y(N)}{l(t(i))}f_1(t(i))+\frac{y(N)}{l(t(i))}f_2(t(i))\right]^T$$

$$Q=[q_1(t(i)),\ \ldots\ ,q_N(t(i))]^T,$$

where all variables are defined in Equation (2).

The solution of linear algebraic system is a vector of Lagrangian coordinates $Q=[\dot{q}_1(t(i)), \ldots, q_N(t(i))]^T$ at the instant t(i). At step 1040, the vector of the Lagrangian coordinates at the time instant t(i) is used as initial conditions to solve the ODE model of the elevator system. The ODE model of equation (2) is solved starting from the initial conditions Q using the measurements of the boundary sensors $f_1(t)$, $f_2(t)$. The solution of the ODE model of the elevator system produces an approximation 1050 of the sway of the elevator rope u(y, t) at all instant t in the interval [t(i), t(ix+1)].

Figure 11:
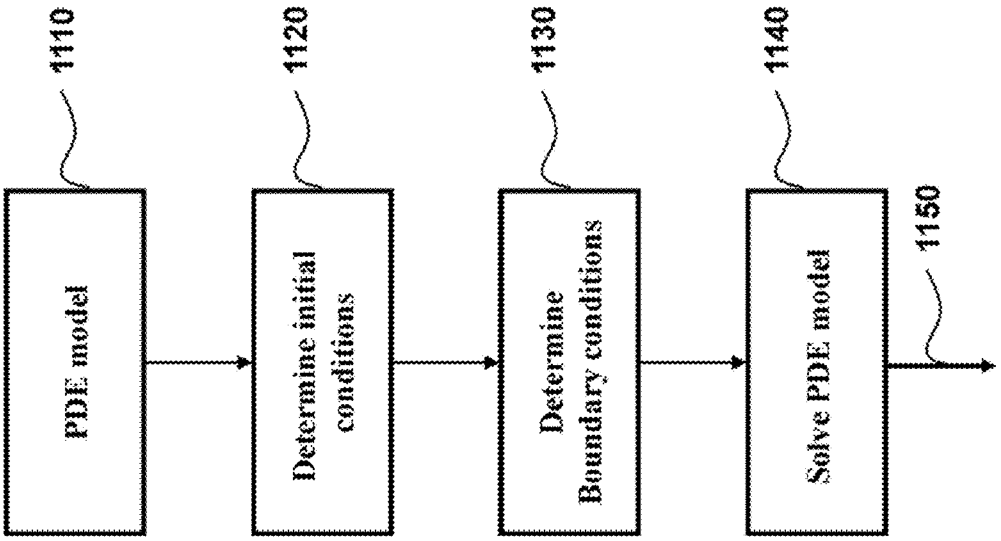

FIG. 11 shows another embodiment of the invention. The state of the elevator system is analyzed between two time instants t(i) and t(i+1), where at least one sway sensor detects the motion. For all instances of time/between the two time instants t(i) and t(i+1) none of the sway sensors detects the motion. At step 1110, during time interval [t(i), t(i+1)], a partial differential equation (PDE) model of the elevator system is formulated. An example of the PDE model is given by Equation (1).

At step 1120, the current measurement of the motion of the elevator rope at the instant t(i) is used to determine the initial conditions of the PDE model according to:

$$u(y,t(i)),\dot{u}(y,t(i)). \tag{6}$$

At step 1130, the measurements boundary sensors at real-time are used as boundary conditions for the PDE model according to $$u(0,t)=f_1(t)$$

$$u(i(t),t)=f_2(t),t\epsilon]t(i)(i+1)[ \tag{7}$$

At step 1140, the PDE model is solved using the initial and boundary condition to produce an approximation 1150 of the sway of the elevator rope u(y,t) u(y, t) at all time-instants t in the interval [t(i), t(i+1)].

Figure 13:
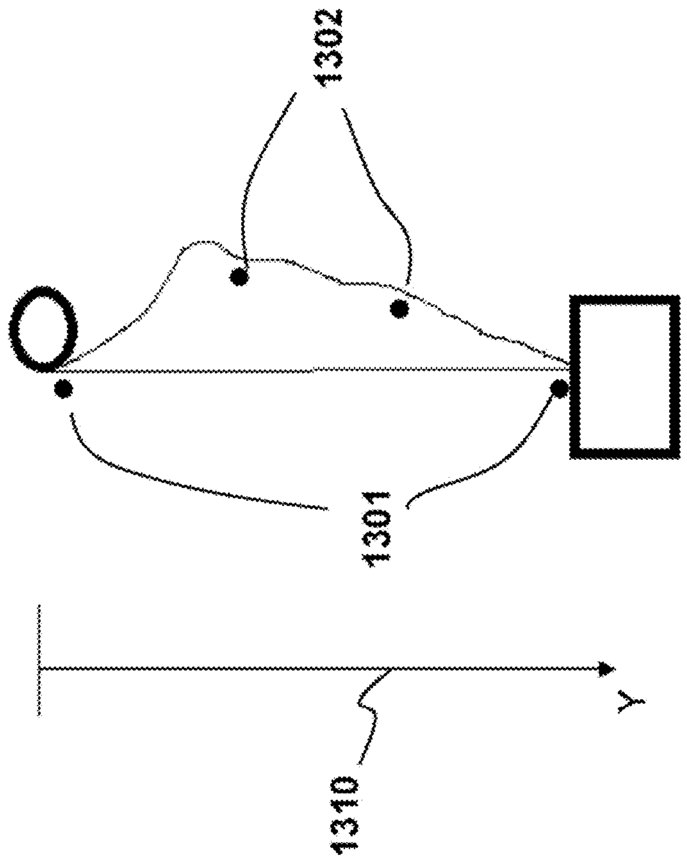
FIGS. 13-16 are schematics of different placement of the sway sensors according some embodiment of the invention.

FIGS. 13-16 show different placement of the sway sensors according some embodiment. In one embodiment a set of sway sensors 1302 is placed vertically to sense a set of independent sway locations along the length of the elevator shaft indicated schematically by an axis Y 1310, as shown in FIG. 13. This embodiment can also include boundary sensors 1301 for determining boundary measurements.

Figure 14:
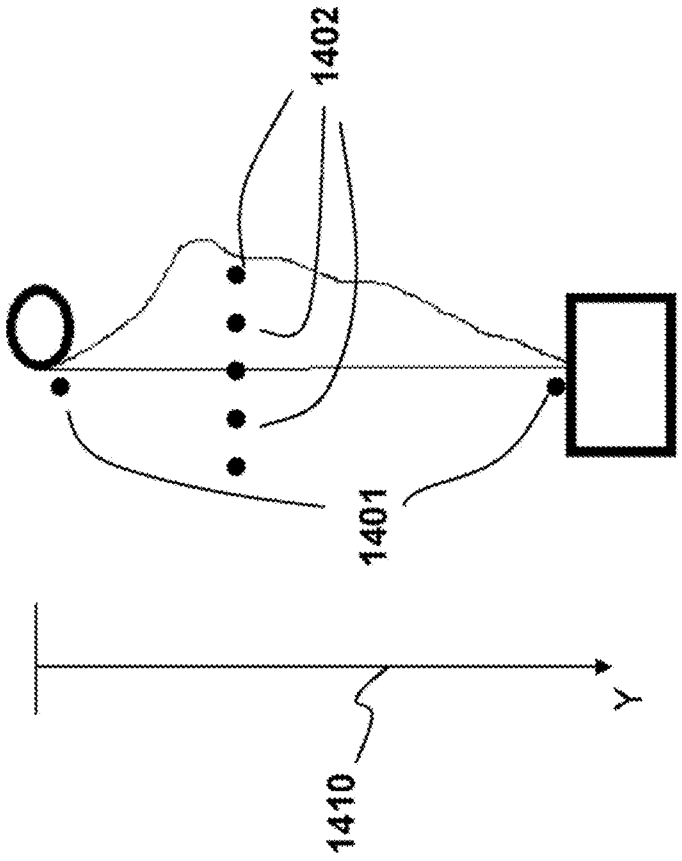

In another embodiment, the sway sensors are placed indifferent dependent positions 1402 horizontally in the elevator shaft 1410, as shown in FIG. 14. The first and second boundary sensors placed for example at the pulley and at the elevator car, respectively 1401. In this embodiment, the sway of the elevator rope sway is estimated by interpolating the sway sensors measurements and the boundary sensors measurements at each instant when one of the sway sensors detects the motion of the elevator rope. In this embodiment the rope sway is estimated based on the sway and boundary sensors measurements only, without the usage of the model.

Figure 15:
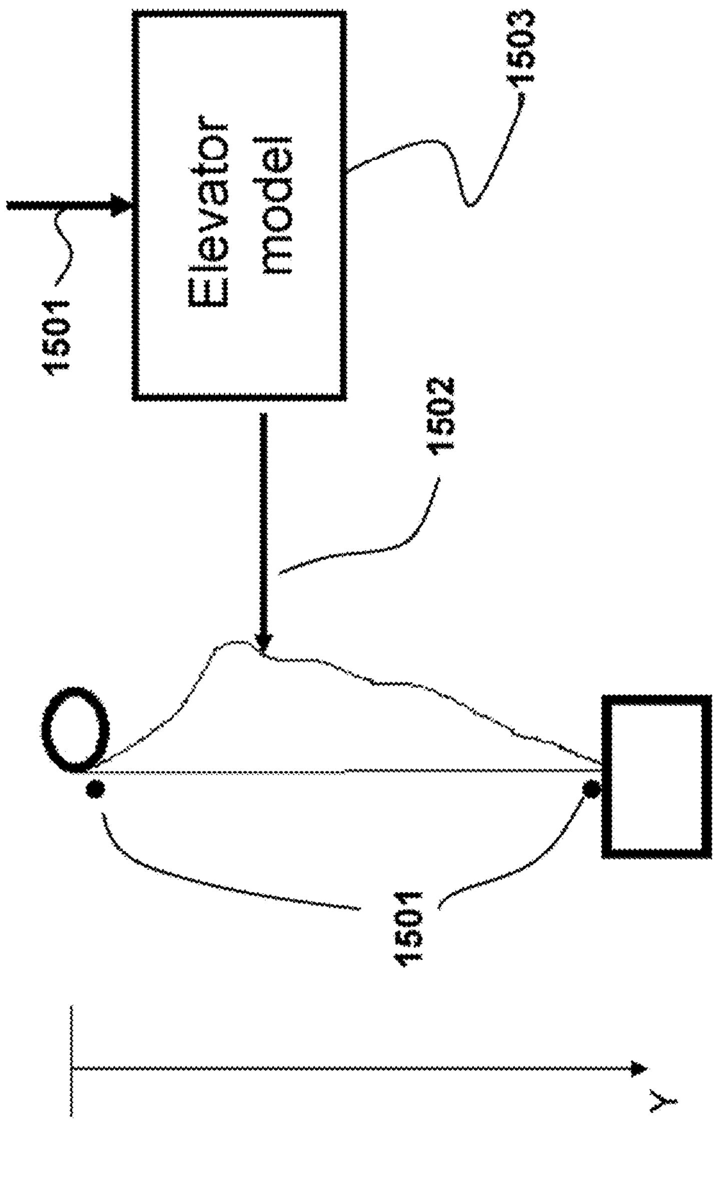

In another embodiment of FIG. 15, the first and second boundary sensors 1501 are placed for example at the pulley 240 and at the elevator car 230, respectively, and the sway of the elevator rope 1502 is determined based on a model of the elevator system 1503 using the boundary sensors measurements 1501. In this embodiment the rope sway is estimated based on the boundary sensors measurements and the system model only, no sway sensors are used.

Figure 16:
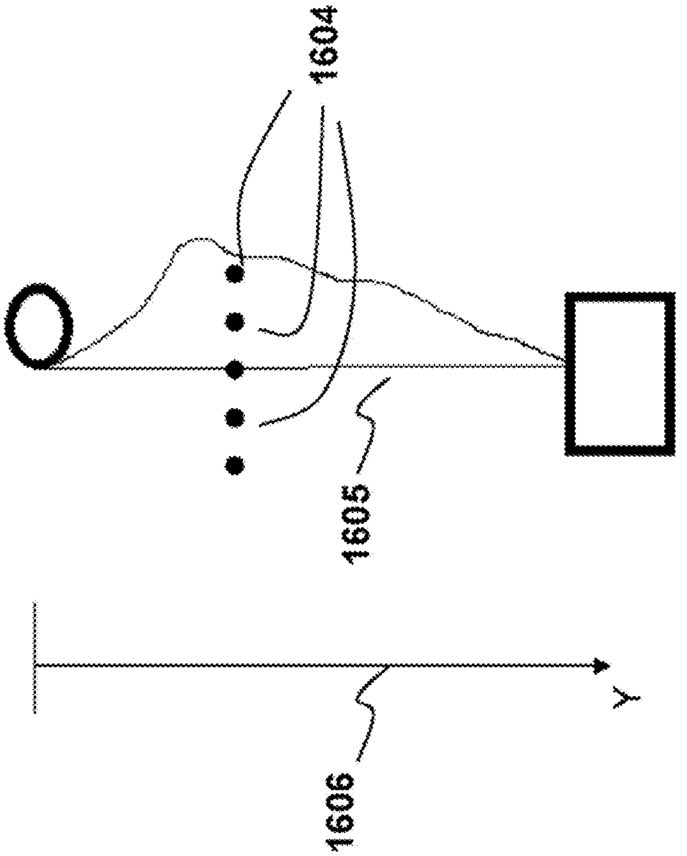

In another embodiment of FIG. 16, the sway sensors are placed in different dependent positions 1604 horizontally in the elevator shaft 1606. In this embodiment, the sway of the elevator rope sway is estimated by interpolating the sway sensors measurements at each instant when one of the sway sensors detects the motion of the elevator rope. In this embodiment the rope sway is estimated based on the sway sensors measurements only, no boundary sensors, e.g., the measurements of boundary sensors are determined to be zero, and no model is used. The rope sway estimated in this embodiment is a relative rope sway, relative to a neutral line 1605.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Further, it should be appreciated that a computer may be embodied in any of a number of forms, such as a rack-mounted computer, a desktop computer, a laptop computer, minicomputer, or a tablet computer. Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. For example, some embodiments of the invention use MATLAB-SIMULIMK.

In this respect, the invention may be embodied as a computer readable storage medium or multiple computer readable media, e.g., a computer memory, compact discs (CD), optical discs, digital video disks (DVD), magnetic tapes, and flash memories. Alternatively or additionally, the invention may be embodied as a computer readable medium other than a computer-readable storage medium, such as a propagating signal.

The terms “program” or “software” are used herein in a generic sense to refer to any type of computer code or set of computer-executable instructions that can be employed to program a computer or other processor to implement various aspects of the present invention as discussed above.

Computer-executable instructions may be in many forms, such as program modules, executed by one or more computers or other devices. Generally, program modules include routines, programs, objects, components, and data structures that perform particular tasks or implement particular abstract data types. Typically the functionality of the program modules may be combined or distributed as desired in various embodiments.

Also, the embodiments of the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as “first,” “second,” in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for determining a position of at least one sway sensor in an elevator system for sensing a lateral motion of an elevator rope between a first boundary location and a second boundary location, comprising steps of:

simulating an operation of the elevator system with a model of the elevator system to produce an actual shape of the elevator rope caused by the operation;

determining at least one sway location, such that an error between the actual shape of the elevator rope and an estimated shape of the elevator rope is minimized, wherein the estimated shape of the elevator rope is determined by an interpolation of the first boundary location, the second boundary location, and the sway location; and determining the position of the sway sensor, such that during an operation of the elevator system the sway sensor senses the lateral motion of the elevator rope at the sway location for determining a sway of the elevator rope by the interpolation, wherein the steps of the method are performed by a processor.

2. The method of claim 1, further comprising:

repeating the simulating the operation for a set of conditions of the disturbance to produce a set of sway locations; and determining the sway location based on the set of sway locations.

3. The method of claim 2, further comprising:

averaging locations in the set of sway locations to produce the sway location.

4. The method of claim 2, further comprising:

determining positions of sway sensors for sensing the lateral sway of the elevator rope at the set of sway locations.

5. The method of claim 1, further comprising:

determining iteratively a set of sway locations until the error between the actual shape of the elevator rope and the estimated shape of the elevator rope is less than a threshold, wherein the estimated shape of the elevator rope is determined by interpolation of the first boundary location, the second boundary location, and locations in the set of sway locations.

6. The method of claim 5, further comprising:

increasing a size of the set of the swept locations, if the error is greater than the threshold and the size is less than a maximum size of the set of the swept locations.

7. The method of claim 1, further comprising:

determining the sway location based on a non-linear optimization of the error under constraints.

8. The method of claim 1, wherein the determining the sway location includes:

selecting an initial set of sway locations on the actual shape of the elevator rope;

determining, for each location in the initial set, the error between the actual shape of the elevator rope and the estimated shape of the elevator rope determined separately for each location in the initial set; and selecting from the initial set a location corresponding to a minimum error as the sway location.

9. The method of claim 1, further comprising:

formulating a cost function of a time of the simulation, a length of the elevator rope between the first boundary location and the second boundary location, the error, and a function of conditions of disturbance; and minimizing the cost function to determine the sway location.

10. The method of claim 1, further comprising:

determining the interpolation between the first boundary location, the second boundary location, and the sway location using a curve fitting.

11. The method of claim 10, further comprising:

determining the interpolation using a B-spline interpolation.

12. The method of claim 1, further comprising:

arranging a first boundary sensor for measuring the first location of the lateral motion of the elevator car in an elevator system;

arranging a second boundary sensor for measuring the second location of the lateral motion of the pulley in the elevator system;

arranging the sway sensor for sensing the lateral sway of the elevator rope at the sway location; and determining the sway of the elevator rope during an operation of the elevator system by interpolating the first location, the second location, and the sway location.

13. A system for determining a sway location in an elevator system for sensing a lateral motion of an elevator rope between a first boundary location and a second boundary location, comprising:

at least one processor for simulating an operation of the elevator system with a model of the elevator system to produce an actual shape of the elevator rope caused by the operation, and to determine determined the sway location, such that an error between the actual shape of the elevator rope and an estimated shape of the elevator rope is minimized, wherein the estimated shape of the elevator rope is determined by an interpolation of the first boundary location, the second boundary location, and the sway location, and for determining, during an operation of the elevator system, a sway of the elevator rose using the interpolation.

14. The system of claim 13, wherein the processor is configured to determine iteratively a set of sway locations until the error between the actual shape of the elevator rope and the estimated shape of the elevator rope is less than a threshold, wherein the estimated shape of the elevator rope is determined by interpolation of the first boundary location, the second boundary location, and locations in the set of sway locations.

15. The system of claim 13, wherein the processor is configured to minimize a cost function of a time of the simulation, a length of the elevator rope between the first boundary location and the second boundary location, the error, and a function of conditions of disturbance to determine the sway location.

16. The system of claim 13, wherein the processor determines the interpolation using a B-spline interpolation.

* * * * *